2,793,193

SLUDGE TREATMENT

Paul W. Fischer, Whittier, and Harold J. Matthews, Santa Paula, Calif., assignors to Union Oil Company of California, Los Angeles, Calif., a corporation of California No Drawing. Application November 25, 1955, Serial No. 549,199

9 Claims. (Cl. 252—329)

This invention relates to the treatment of petroleum sludges, and in particular concerns an improved method for recovering clean oil from petroleum oil emulsions containing dispersed solids.

In the production of petroleum the crude oil is almost invariably initially obtained contaminated with water or brine, and in many instances is further contaminated with small amounts of solid materials such as sand and clay. The water is thoroughly emulsified in the oil, and great difficulty is experienced in resolving such emulsions, particularly when dispersed solids are present. Similar emulsions are often formed when water- or brine-wet oil is stored in steel tanks or transported through steel pipes; iron oxide is formed by corrosion of the steel surfaces and tends to stabilize the emulsions of water and oil. Where high sulfur oils are involved, bacterial action may form hydrogen sulfide which corrodes iron and steel to form iron sulfides which likewise appear to have a strong stabilizing action on water- and oil-emulsions In general, then, in the production and handling of crude oil there are numerous ways in which heavy sludges comprising water or brine, oil, and stabilizing solids are formed, and the problem of treating such sludges to recover the oil therefrom is one of great magnitude and economic importance. A single oil field may produce as much as 2000–4000 barrels per month of sludge containing 30–90 percent of oil, but such oil is worthless unless it can be substantially freed of solids and its water content reduced to less than about 3 percent, preferably to less than about 0.5 percent. Even if the value of the oil be discounted, the problem of disposing of such quantities of sludge still remains.

We are aware that various processes, e. g., settling, chemical treatment, electrical dehydration, and the like, have been proposed for breaking petroleum emulsions. However, where the emulsion is stabilized by the presence of dispersed solids, the processes heretofore applied leave much to be desired. Usually, some degree of recovery of clean oil is achieved, but there almost invariably remains a heavy sludge which resists further resolution.

It is accordingly an object of the present invention to provide an improved process for recovering a maximum of clean oil from sludges comprising water or brine, petroleum oil, and solids.

A further object is to provide a method for resolving exceptionally stable petroleum emulsions.

Other and related objects will be apparent from the following detailed description of the invention, and various advantages not specifically referred to herein will occur to those skilled in the art upon employment of the invention in practice.

We have now found that the foregoing objects and attendant advantages may be realized in a process which comprises treating the sludge with a particular type of sodium silicate and a particular type of organic demulsifying agent, followed by relatively gentle heating and agitation and settling at an elevated temperature. More particularly, we have found that heavy emulsified sludges comprising water, oil, and dispersed solids can be treated to recover substantially all of the oil in clean dry form by a process which essentially comprises (1) admixing with the sludge between about 0.1 and about 5 pounds per barrel of sodium silicate (dry basis) having a mole ratio of $Na_2O/SiO_2$ greater than about 1/1.5, and between about 0.05 and about 0.5 pound per barrel of an organic demulsifying agent selected from the class consisting of oil-soluble alkali-metal soaps of sulfonated fats and glyceride oils and oil-soluble alkali-metal soaps of sulfonated petroleum hydrocarbons, (2) heating the mixture with gentle agitation to a temperature between about 130° F. and about 200° F. and (3) allowing the mixture to stand quiescent at a temperature between about 130° F. and about 200° F. for at least 3 hours, and (4) decanting the substantially water-free supernatant oil phase.

While all of the factors and operating variables included in the above statement of the process of the invention are of more or less critical import, probably the most critical is that of the type of sodium silicate employed. It is essential to the recovery of the maximum quantity of clean oil that the mole ratio of sodium oxide to silicon dioxide ($Na_2O/SiO_2$) be at least about 1/1.5, preferably between about 1/1.2 and about 1/0.8. The data tabulated below demonstrate the effect of this ratio on the amount of clean oil recovered from a typical heavy sludge. Said sludge was one which had accumulated in a skimming pond at a refinery in the Los Angeles area. The skimming pond served as a central settling basin into which crude oil, residual oils from distillation operations, refinery slops, and the like were discharged for gravity separation from water, brine, drilling mud, rust, etc. The sludge contained about 45 percent petroleum hydrocarbons, about 47 percent water, and about 8 percent solids. In each separation experiment 5.3 grams of sodium silicate in the form of an aqueous solution and 0.6 gram of the sodium soap of sulfonated castor oil were added to a 1000 ml. sample of the sludge. The mixture was slowly heated to 180° F. with gentle agitation over a period of about 10 minutes. The agitator was then turned off, and the mixture was allowed to stand quiescent at 180° F. From time to time over a period of 42 hours each sample was inspected and the volume of the supernatant clean oil phase was noted, and in each instance the percent recovery of clean oil was calculated. Similar experiments were performed in which the sodium silicate was replaced by certain other alkaline treating agents which have been proposed for the same use. The following data were obtained:

Alkaline Treating Agent at 1.8 lbs./bbl.
Organic Demulsifying Agent at 0.3 lbs./bbl.
Temperature of Treatment=180° F.

| Exp't No. | Alkaline Treating Agent | | Settling Time, hours | Clean Oil Separated, Percent of Total Oil Present |
|---|---|---|---|---|
| | Identity | $Na_2O/SiO_2$ | | |
| 1 | Sodium silicate | 1/0.6 | 4 | 85 |
| | do | 1/0.6 | 24 | 94 |
| 2 | Sodium silicate | 1/1 | 4 | 33 |
| | do | 1/1 | 16 | 89 |
| | do | 1/1 | 42 | 94 |
| 3 | Sodium silicate | 1/2 | 16 | 67 |
| | do | 1/2 | 42 | 84 |
| 4 | Sodium silicate | 1/3.2 | 42 | 69 |
| 5 | Sodium hydroxide | | 24 | 0 |
| 6 | Sodium phosphate | | 24 | [1] 80 |

[1] (High solids content.)

As previously stated, the sodium silicate reagent is employed in an amount representing between about 0.1 and about 5 pounds per barrel of sludge of an dry basis. In practice, however, the sodium silicate is never employed as a dry solid but is provided in the form of an aqueous solution of between about 10 and about 50 percent, preferably between about 30 and about 40 percent, concentration. Commercially available sodium silicate solutions in which the $Na_2O/SiO_2$ ratio is too low for the present use may be adapted therefor by suitably adjusting the water and/or sodium hydroxide content. For example, "N Grade" sodium silicate, which is a 41° Bé. solution of sodium silicate having an $Na_2O/SiO_2$ ratio of 1/3.2, may be rendered suitable for the present purpose by adding thereto a substantially equal volume of 25° Bé. aqueous sodium hydroxide. Ordinary water glass may be employed if sufficient sodium hydroxide is added to bring th $Na_2O/SiO_2$ ratio up to 1/1.5 or higher.

The nature and identity of the organic demulsifying agent which is employed in conjunction with the sodium silicate is likewise of great importance in attaining the maximum recovery of clean oil. As stated, such agent is one selected from the class consisting of oil-soluble alkali-metal soaps of sulfonated fats and glyceride oils and oil-soluble alkali-metal soaps of sulfonated petroleum hydrocarbons. Among the sulfonated fats and oils, sulfonated castor oil is preferred although sulfonated lard oil, sulfonated palm oil, sulfonated fish oil, sulfonated pine oil, and the like are also operable. The sulfonated petroleum hydrocarbons are represented by the so-called "mahogany" acids which are the oil-soluble sulfonic acids obtained by treating various petroleum oil fractions with strong sulfuric acid. The alkali-metal soaps of any of such sulfonated materials are obtained by conventional saponification procedures, and are available commercially either as such or as concentrated solutions in oil. Either the free soaps or their oil solutions may be employed in accordance with the invention.

The optimum amount of demulsifying agent to be employed depends somewhat upon the nature of the sludge being treated. Relatively "fresh" or recently formed sludges often respond to the use of as little as 0.05 pounds per barrel of the demulsifying agent. On the other hand, sludges that have stood for relatively long periods of time, particularly in the open air as in skimming ponds or settling basins where the oil has had an opportunity to become oxidized and is highly contaminated with rust, iron sulfides and other solids, are more resistant to resolution, and in order to attain good separation of clean oil it may be necessary to employ as much as 0.5 pounds per barrel of the demulsification agent. In general, then, then demulsifying agent is employed at a dosage of between about 0.05 and about 0.5 pounds per barrel, with 0.1–0.3 pounds per barrel representing a good working average. These proportions apply to the active demulsifying agent; when the latter is employed in oil solution the amount of solution employed will be adjusted accordingly.

The present class of demulsifying agents has been found quite superior to the fatty acid and resin soaps which have previously been employed for breaking petroleum emulsions. Thus, in comparative tests carried out in a manner similar to that previously described, employing 1.8 pounds per barrel of sodium silicate ($Na_2O/SiO_2=1/1$) and 0.3 pounds per barrel of the demulsifying agent, sodium oleate and sodium resinate were both found to effect separation of about 75 percent of the oil present in the sludge, whereas with the sodium soap of sulfonated castor oil and sodium mahogany acid soap about 85 percent separation of clean oil was attained. When it is considered that at an average-size refinery many thousands of barrels of sludge containing as much as 70 percent oil are available for treatment, an increase of 10% in recovery efficiency is of great economic importance and contributes greatly to the solution of the disposal problem.

Considering now the operating procedure, it will be apparent to those skilled in the art that many variations thereof are possible and that the process is adapted to the use of entirely conventional equipment. Essentially, the process consists merely in transferring the sludge to be treated and the sodium silicate and organic demulsifying agent to a vessel wherein the mixture can be heated with gentle agitation to a temperature between about 130° F. and about 200° F. The heated mixture is then allowed to stand quiescent at a temperature within said range for at least about 3 hours, during which time it settles into two or more layers, and when maximum stratification is attained the upper layer of clean oil is drawn off and passed to storage. The lower layer or layers are passed to disposal facilities. If desired, the mixing, heating and settling steps may be carried out in the same vessel, although in an operation of any considerable magnitude it is preferred to mix and heat in one vessel and to carry out the settling step in another. This preference arises out of the unexplained fact that somewhat better results are often attained if the vessel employed for heating the mixture is of relatively small size, e. g., less than 2000 bbls. capacity. It has also been found desirable that the treating agents, particularly the sodium silicate solution, be admixed with the sludge as quickly as possible, and it is accordingly preferred to employ a jet-type mixer or high speed proportioning pump.

According to one mode of carrying out the process in a continuous manner, the sludge is continuously passed from a storage tank through a suitable metering pump and transfer line into the bottom of a cone-bottomed treating vessel of about 10 bbls. capacity. The latter is equipped with an internally mounted steam heating coil and with a paddle agitator. Aqueous sodium silicate and a hydrocarbon oil solution of the demulsification agent are continuously withdrawn from separate storage tanks and are metered into the transfer line in the proper proportions and in such manner that substantially instantaneous mixing of the sludge and treating agents is attained therein. The rate of introduction and heating are so controlled that by the time any particular increment of the mixture reaches the top of the treating vessel it has been heated to a temperature of about 180° F. The agitator is operated at a paddle speed of 1000 R. P. M. or less so that the upward flow of the mixture through the vessel is substantially quiet and without excessive turbulence. The treating vessel is open at the top and is mounted within a cone-bottomed settling vessel of about 100 bbls. capacity. The path of the mixture is thus upwardly through the treating vessel and out over the open top thereof into the surrounding settling vessel. The latter is preferably insulated so that the mixture can stand quiescent therein for as long as 24 hours without cooling to below about 130° F.; alternatively the temperature within the settling vessel may be maintained by suitable heating coils. The settling vessel is fitted at its top with an overflow line through which the upper clean oil phase is withdrawn, and also with a bottom conduit through which the lower phase or phases are continuously or intermittently withdrawn. The rate at which the sludge and treating agents are introduced into the system are so controlled that the residence or settling time of any particular increment of the heated mixture in the settling vessel is about 24 hours. According to a particular preferred mode of operation, a portion of the clean oil which is decanted from the settling tank is recycled and introduced into the sludge transfer line just prior to its entry into the treating vessel.

The process may also be operated in such manner as to eliminate the settling vessel and to employ in lieu thereof the sludge storage tank. According to this mode of operation, the sludge is pumped from the storage tank through a circuit which comprises a heating coil or furnace, a small mixing chamber, and a transfer line back to the storage tank. The size and arrangement of the transfer lines is such as to avoid excessive turbulence. The demulsifying agent may be added directly to the tank or at any point in the circuit, but the sodium silicate solution is injected into the line leading to the mixing vessel. The rate of pumping the sludge through the circuit is controlled so as to pump the entire contents of the storage tank once through the circuit in a period of 24–48 hours, and the rates of adding the treating agents are so controlled that the required amount of each is introduced into the system in approximatley the same period of time. The point of entry of the recirculated sludge into the storage tank is desirably as far as possible from the point of withdrawal; preferably the sludge is withdrawn from the bottom of the tank and re-introduced at the top. The heating coil may be a simple pipe still so designed and operated that the material passing therethrough is heated to a temperature of about 180°–190° F. The mixing chamber may suitably be a simple cylinder, about 3 feet in diameter and 7 feet high, equipped at the bottom with an inlet line and at the top with an outlet line. Agitation within the mixing chamber may be provided by means of a paddle stirrer operating at 400–1000 R. P. M.

Somewhat less preferably, the same method may be employed by combining the storage tank and heater, e. g., by placing a heating coil within the storage tank and eliminating the outside heater. The outside circuit thus becomes simply a mixing circuit in which mixing of the sodium silicate and gentle agitation are attained by a suitable circulation pump.

As previously stated, upon being allowed to settle for 3 or more hours at 130°–200° F. and in the presence of the stated quantities of sodium silicate and demulsifying agent, the sludge separates into at least two phases, the upper of which is clean oil. In some instances, the solids contained in the sludge remain more or less uniformly dispersed in the lower water phase, whereas in others the solids are for the most part contained in a small emulsified phase lying between the upper oil phase and the lower water phase. In any case, however, the particular combination of treating agents herein defined and the particular operating conditions described effect an unusually clean-cut separation of phases. One of the most desirable features of the process of the invention is that it not only effects the separation of a large amount of the oil present but separates such oil in exceptionally clean form. Many of the prior art processes for treating solids-containing sludges effected a relatively good separation of oil and water but left considerable amounts of solids suspended in the oil phase so that the latter had to be further treated for the removal of such solids.

While the invention has been described as being applicable to sludges comprising an emulsion of oil and water carrying suspended solids, it should be understood that the term "water" includes aqueous salt solutions, e. g., oil field brine. Similarly, while only sodium silicate has been referred to as the alkaline treating agent it should be realized that other alkali-metal silicates, e. g., potassium silicate, ammonium silicate, etc. may likewise be employed provided the stated ratio of alkali-metal oxide to silicon dioxide is maintained.

This application is a continuation-in-part of our copending application, Serial No. 239,418, filed July 30, 1951, now abandoned.

Other modes of applying the principle of our invention may be employed instead of those explained, change being made as regards the method or materials employed provided the step or steps stated by any of the following claims, or the equivalent of such stated step or steps, be employed.

We, therefore, particularly point out and distinctly claim as our invention:

1. The method of recovering clean oil from oil sludges comprising an emulsion of water and petroleum containing dispersed solids which tend to stabilize said emulsion, which comprises (1) admixing with said sludge (a) between about 0.1 and about 5 pounds per barrel of sodium silicate in the form of an aqueous solution of between about 10 and about 50 weight percent concentration, the ratio of $Na_2O$ to $SiO_2$ in said sodium silicate being greater than about 1 to 1.5; and (b) between about 0.05 and about 0.5 pound per barrel of an organic demulsifying agent selected from the class consisting of oil-soluble alkali-metal soaps of sulfonated fats and sulfonated glyceride oils and oil-soluble alkali-metal soaps of sulfonated petroleum hydrocarbons; (2) heating the resulting mixture with gentle agitation to a temperature between about 130° F. and about 200° F.; (3) allowing the heated mixture to stand substantially quiescent at a temperature between about 130° F. and about 200° F. for at least about 3 hours; and (4) separating the supernatant oil phase.

2. The method of claim 1 wherein the organic demulsifying agent is an oil-soluble sodium soap of a sulfonated glyceride oil.

3. The method of claim 1 wherein the organic demulsifying agent is an oil soluble sodium soap of sulfonated castor oil.

4. The method of claim 1 wherein the organic demulsifying agent is an oil-soluble sodium soap of "mahogany acids."

5. The method of claim 1 wherein the ratio of $Na_2O$ to $SiO_2$ in the sodium silicate is between about 1 to 1.2 and about 1 to 0.8.

6. The method of recovering clean oil from oil sludges comprising an emulsion of water and petroleum containing dispersed solids which tend to stabilize said emulsion, which comprises (1) admixing with said sludge (a) between about 0.1 and about 5 pounds per barrel of sodium silicate in the form of an aqueous solution of between about 10 and about 50 weight percent concentration, the ratio of $NaO_2$ to $SiO_2$ in said sodium silicate being between about 1 to 1.2 and about 1 to 0.8; and (b) between about 0.1 and about 0.3 pound per barrel of an organic demulsifying agent selected from the class consisting of oil-soluble alkali-metal soaps of sulfonated fats and sulfonated glyceride oils and oil-soluble alkali-metal soaps of sulfonated petroleum hydrocarbons; (2) heating the resulting mixture with gentle agitation to a temperature between about 130° F. and about 200° F.; (3) allowing the heated mixture to stand substantially quiescent at a temperature between about 130° F. and about 200° F. for at least about 3 hours; and (4) separating the supernatant oil phase.

7. The method of claim 6 wherein the organic demulsifying agent is an oil-soluble sodium soap of a sulfonated glyceride oil.

8. The method of claim 6 wherein the organic demulsifying agent is an oil-soluble sodium soap of sulfonated castor oil.

9. The method of claim 6 wherein the organic demulsifying agent is an oil-soluble sodium soap of "mahogany acids."

References Cited in the file of this patent

UNITED STATES PATENTS

| Number | Name | Date |
|---|---|---|
| 1,223,659 | Barnickel | Apr. 24, 1917 |
| 1,531,173 | Brady | Mar. 24, 1925 |
| 1,602,190 | Eddy et al. | Oct. 5, 1926 |
| 1,659,998 | Keiser | Feb. 21, 1928 |
| 1,758,802 | Penn | May 13, 1930 |
| 1,897,574 | De Groote et al. | Feb. 14, 1933 |
| 1,944,021 | Walker | Jan. 16, 1934 |
| 2,027,965 | Dellmann | Jan. 14, 1936 |
| 2,034,963 | Stehr | Mar. 24, 1936 |